United States Patent [19]

Smith et al.

[11] Patent Number: 4,897,688

[45] Date of Patent: Jan. 30, 1990

[54] DOCUMENT IMAGING SYSTEM WITH BI-DIRECTIONAL ANAMORPHIC MAGNIFICATION CAPABILITY

[75] Inventors: Abbott Smith, Webster; James D. Rees, Pittsford; David A. Bartman, Rochester; Gilbert Aser, deceased, late of Rochester, all of N.Y., by Diane B. Aser, executrix

[73] Assignee: Xerox Corporation, Stamford, Conn.

[21] Appl. No.: 285,172

[22] Filed: Dec. 16, 1988

[51] Int. Cl.⁴ .............................................. G03B 27/68

[52] U.S. Cl. ...................................................... 355/52

[58] Field of Search .............................. 355/1, 238, 52

[56] References Cited

U.S. PATENT DOCUMENTS 4,678,321 7/1987 Inokuchi .............................. 355/52

*Primary Examiner*—Donald A. Griffin

[57] ABSTRACT

An imaging system in a copier is modified so as to scan original documents at speeds differing from the image medium speed through the exposure zone so as to anamorphically reduce or enlarge the projected image. A two process scanning operation results in an output image reduced or enlarged in two dimensions. Resolution is maintained by forming an effective imaging width of approximately 1 mm by using a combination of a lens array providing a narrow irradiance profile with an optically aligned slit of smaller width. Magnification values of from 0.50 to 1.5 are thereby enabled.

7 Claims, 2 Drawing Sheets

DOCUMENT IMAGING SYSTEM WITH BI-DIRECTIONAL ANAMORPHIC MAGNIFICATION CAPABILITY

BACKGROUND AND INFORMATION DISCLOSURE STATEMENT

This invention relates to a multi-magnification document reproduction machine, and more particularly, to an imaging system adapted to produce anamorphically reduced or enlarged copies of an original document.

The concept of anamorphically reducing or enlarging an image via a velocity mis-match of a scanned image to a moving recording medium is known in the photographic and copy art. U.S. Pat. Nos. 3,126,809, 4,111,551 and 3,967,898 associated with the photographic art, disclose the production of copies from a negative by elongating or reducing the copy in a single direction. In 4,111,551 a negative and a photosensitive film are separately transported at different linear speeds past an elongated pair of drive rollers. The extent of image compression or elongation can be varied continuously by means of a differential speed drive mechanism interconnecting the drive roller. In 3,126,809, a negative and print paper are moved relative to each other while the negative is being illuminated through a moving mode with a light slit. In 3,967,898, a predetermined amount of distortion in one direction is produced by varying the relative motion of a film image sheet and a superimposed photosensitive material sheet across a light slit.

An anamorphic scanning system is also disclosed in U.S. Pat. No. 3,861,797. An original is reproduced in one direction at the original size and then elongated or compressed in a second direction. An original document is placed on a movable platen and illuminated by a light source so as to cause an image to be projected by a lens beneath the platen through a pair of slits onto a sensitive film disposed in an image plane. The relative speed of the platen and the film are varied to obtain the desired uni-directional magnification.

The resolution requirements for reproducing documents at varying magnification values have hitherto required an optical system in which a projection lens is moveable along an optical path, is conjunction with repositioning of mirrors. Alternatively, a zoom lens assembly in used having internal lens elements movable with respect to each other with the entire lens assembly also movable along an optical path. These conventional magnification imaging systems are relatively expensive due to the mechanism for maintaining total conjugate and the cost of the projection lenses. Anamorphic magnification has suggested the possibility of producing reduced and/or enlarged copies without the need for the conventional, expensive optical systems described above. The main problem to be overcome is to maintain copy resolution while anamorphically scanning a document and, in effect, producing a distorted image in the scan direction. The solution to this problem, according to one aspect of the present invention, has been found to lie in narrowing the scan slit width at the photosensitive output medium from the 12 mm, typical with conventional lens systems, to a width of about 1 mm or less. The narrower the slit width, the sharper the anamorphic image formed on the output medium. However, with the narrowing of the slit width, exposure is reduced requiring an increase in illumination requirements. Any practical system therefore has to be devised to optimize these two crucial factors. A third requirement is that there must be true two-dimensional reduction or enlargement of a quality equal to conventional multi-magnification system e.g. that the final copy be isomorphic. Applicants by this invention have achieved these goals, as will be described below.

There are additional prior art disclosures in the copier art disclosing anamorphic magnification imaging systems. For example, U.S. Pat. No. 4,583,846 discloses a slit exposure type machine which regulates the differential speeds of the scanning and recording medium in a known manner. The resolution of the anamorphically reduced or enlarged image is maintained by the introduction of a rotatable triangular shaped prism into the optical path between a projection lens and the recording medium. Another type of anamorphic imaging system is disclosed in U.S. Pat. No. 4,536,084. In this system, a conventional lens is used to normally copy documents in a 1X magnification. For a magnification change, an auxiliary anamorphic lens system is introduced into the optical path, the auxiliary system having different imaging magnifications in orthogonal directions. A third type of anamorphic magnification is briefly disclosed in U.S. Pat. No. 4,194,827, column 7, lines 39–40. The imaging system for the photocopy machine comprises a line or array of parallel coherent optical fibers, the ends of which are in virtual contact with an original document and a photosensitive copy sheet. The document is illuminated by a light source directing light through an optical element attached to the fibers. The imaging system utilizes a narrow exposure slit and, in column 7, it is suggested that the speed of the documents relative to the speed of the photosensitive record medium could be varied to provide variable enlargement or reduction of the copy along the direction of travel. Images formed by this system are "wrong reading" and require an additional transfer step.

These previous, prior art anamorphic systems, either have disadvantages and/or do not fulfill all of the requirements for a fully-realized, multi-magnification copier. The system of U.S. Pat. No. 4,583,846 provides for anamorphic magnification in a single direction and requires the use of a prism to maintain adequate resolution. U.S. Pat. No. 4,536,084 requires the use of a second imaging system to be used in conjunction with a 1X projection lens, a costly alternative requiring additional machine space. The imaging system of 4,194,827 does not disclose producing final copies magnified in both dimensions and is further disadvantaged by forming a "wrong-reading" image on the recording medium.

The present invention is therefore directed to a scanning system which, in a preferred embodiment, utilizes a linear gradient index lens array, inherently having a small effective slit width, to project an image of an original onto an imaging plane. The lens may comprise a plurality of gradient index lenses assembled into an array, known conventionally as a SELFOC (TM) lens array. The lens array has a characteristically narrow image plane irradiance profile width of 3–6 mm which is further reduced, according to the present invention, by a narrow slit positioned between the lens and the recording medium. Documents may be copied at a conventional 1:1 ratio. Anamorphic reduction or enlargement of the copy is achieved by varying the ratio of the speeds of the document and image plane relative to the lens array during the scan/exposure cycle. The document is illuminated by an optimally designed illumination system to provide the exposure necessary to maintain the desired resolution through typical compression (reduction) or elongation (enlargement) ranges of ±50%. According to another aspect of the invention, two-dimensional (isomorphic) reduction or enlargement is enabled by a two-pass operation which includes using a copy which has an image anamorphically magnified in a first direction as an original which is then rotated 90° relative to the scan direction and scanned, anamorphically, a second time to form the final output copy. More particularly, the invention is directed to a scanning system in a reproduction apparatus which transmits an image of an original document lying in an object plane onto a photosensitive image plane, said image being enlarged or reduced in at least one scanning dimension, said system comprising:

an illumination means adapted to provide an intense narrow beam of light to successive portions of the documents to be copied, a linear gradient index lens array arranged in the optical path so as to project light reflected from said document during said scan, said lens array forming an image plane irradiance profile of first width $d_1$ means for scan/illuminating said document at a speed which is selectively changeable relative to the speed of said image plane and a slit assembly attached to the output face of said lens array, and said image plane, said slit assembly having a slit aperture therethrough, said slit aperture having a width $d_2$ less than said width $d_1$.

DESCRIPTION OF THE INVENTION

Figure 1:
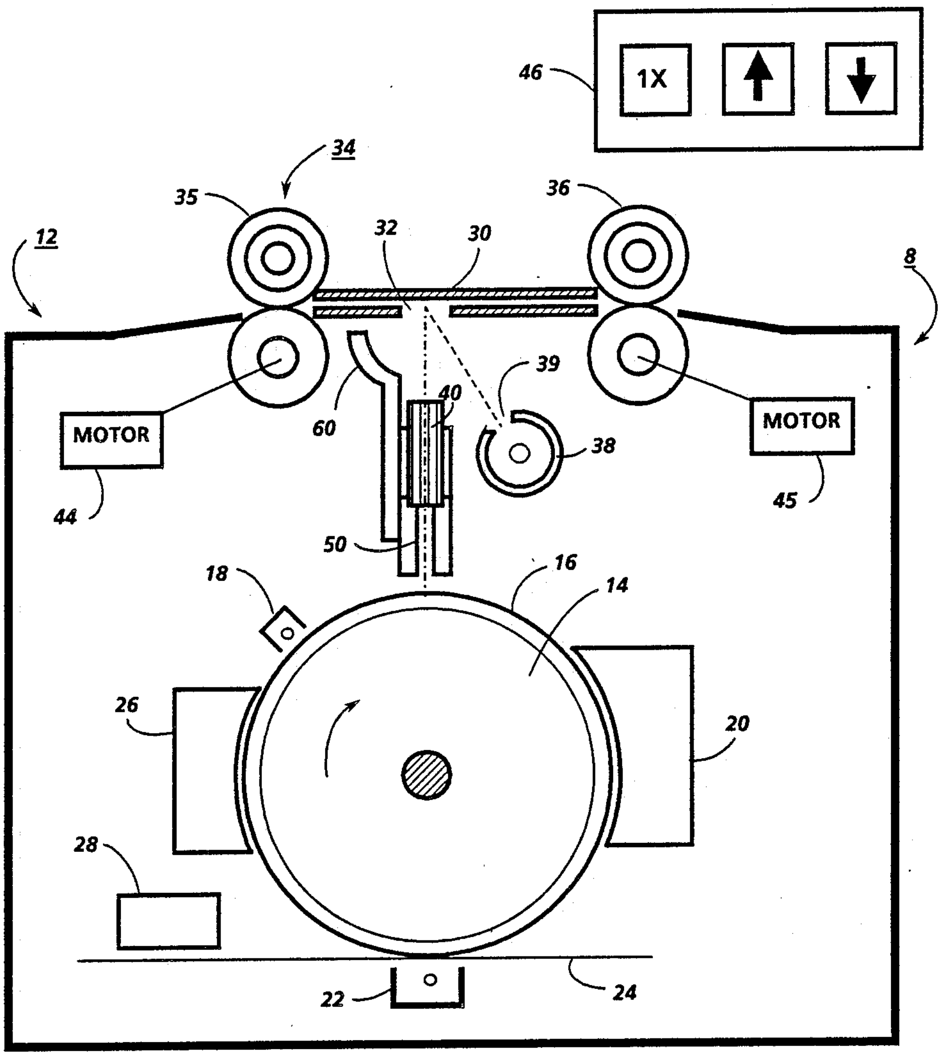
FIG. 1 shows a side schematic view of a coper/printing machine incorporating the anamorphic magnification imaging system of the present invention.

Referring to FIG. 1 of the drawings, there is shown a xerographic type reproduction machine 8 incorporating the anamorphic imaging system of the present invention. Machine 8 is particularly adapted to copy documents having long widths such as blueprints and the like, but the invention is not necessarily limited to this embodiment. Machine 8 has a suitable frame 12 within which the xerographic components and stations are operatively supported. Briefly, and as will be familiar to those skilled in the art, the machine xerographic components include a recording member, shown here in the form of a rotatable drum photoreceptor 14 having a photoconductive surface 16. Other photoreceptor types such as belt, web, etc. may be used instead. Operatively disposed about the periphery of drum 14 are charge station 18, for placing a uniform charge on the photoconductive surface; exposure station 19 where the previously charged surface 16 is exposed to image rays of a document (not shown) being copied or reproduced; development station 20 where the latent electrostatic image created on photoconductive surface 16 is developed by toner; transfer station 22 for transferring the developed image to a suitable copy substrate material such as a copy sheet 24 brought forward in timed relation with the developed image on surface 16, and cleaning station 26 for removing leftover developer from surface 16 and neutralizing residual charges thereon. Following transfer, sheet 24 is carried forward to a fusing station 28 where the toner image is fixed. These xerographic processing stations, and the steps incident to operation thereof, are well known in the prior art.

Referring still to FIG. 1, a transparent platen 30 supports a document which is fed from the left hand side of the Figure (front of machine) and is moved past a scan strip area 32 by a constant velocity type transport 34. As will be understood, scan strip 32 is, in effect, a narrow width scan line extending across the width of platen 30 (into the page) at a desired point along the platen where the document is scanned line by line as the document is moved along the platen surface by transport 34. Transport 34 has two sets of input and output feed roll pairs 35, 36, respectively, on each side of scan strip 32 for moving a document across platen 30 at a predetermined speed. Exposure lamp 38 is provided to illuminate scan strip 32. The image rays from the scanned document line are projected and focused by a gradient index fiber lens array 40 having sufficient length to expose the photoconductive surface 16 of the moving drum 14 at exposure station 19. In a preferred embodiment, lens array 40 is an SELFOC lens array. SELFLOC is a trademark of the Nippon Sheet Glass Company of Japan.

Drive rollers 35, 36 are driven by dc stepper motors 44, 45 respectively. These motors are driven at variable pulse rates derived from operator selection at the control panel 46. When operation in a normal 1X reproduction rate is selected, the stepper motor drives the drive roller at a rate which moves the document across the platen at the same speed as the photoreceptor rotation. When a reduction mode is selected, the drive rollers are driven at some value faster than the photoreceptor rotation so that the latent image formed at the photoreceptor is anamorphically distorted (length of the image in the direction of travel is reduced). Selection of an enlargment magnification value will result in the driver roller moving the document at a slower rate than the photoreceptor speed thereby lengthens (elongating) the image in the direction of travel.

Figure 2:
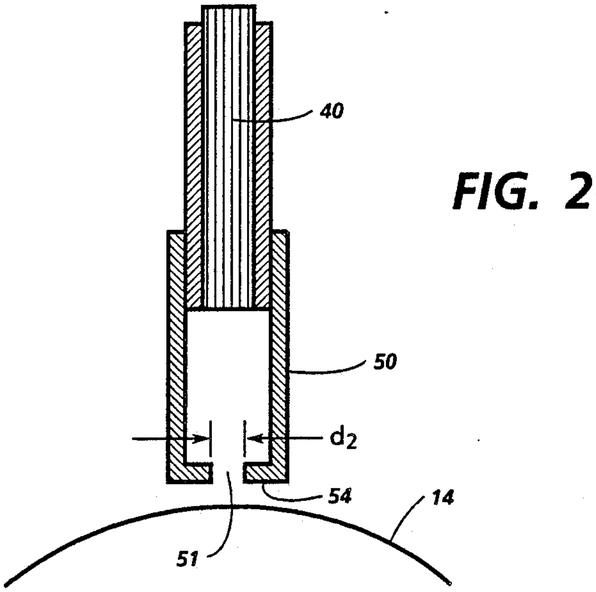
FIG. 2 is an enlarged view of the imaging lens assembly shown in FIG. 1.

As previously mentioned, the key to obtaining anamorphically reduced enlarged images with optimal resolution is to project the document image through a very narrow slit width while maintaining adequate illumination for proper exposure. An optimal slit width has been realized by attaching slit assembly 50 to the bottom of lens array 40 as shown in FIG. 2. This configuration combines the already narrow image plane irradiance profile width $d_1$, inherent in the gradient index lens array 40, with a narrow slit 51 formed at the bottom of assembly 50 and positioned adjacent the surface 16 of photoreceptor 14. Assembly 50 is optically coupled with lens 40 so that slit 51 with width $d_2$ is precisely at the center of the image plane irradiance profile of the lens. Slit 51, in a preferred embodiment, is formed by silk screening techniques, from the body of a plate 54 forming the floor of assembly 50. Slit 51 has a width $d_2$ of 1 mm.

The width $d_1$ of the lens irradiance profile is 5 mm. In order to provide adequate exposure, lamp 38 is a linear fluorescent which includes an aperture 39 preferentially directing output radiation to scan slit 32. Illumination at scan strip 32 is further optimized by placing cylindrical reflector 60 on the opposite side of the scan strip. Reflector 60 is positioned so as to further concentrate light from lamp 38 onto scan strip 32.

Figure 3:
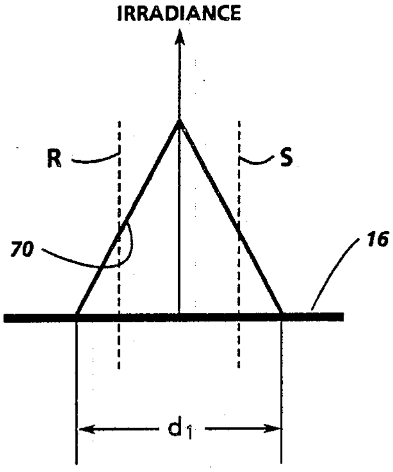
FIG. 3 is an enlarged view of the image plane irradiance profile obtained at the image plane by the combination of the linear lens array and the image plane slit shown in FIG. 1.

The function of the linear gradient index lens arrays that enables anamorphic copying can be better understood by the exposure profile provided by the fibers which comprise the lens. FIG. 3 shows a characteristic triangular irradiance profile 70 produced by a two row gradient index fiber array at the image plane 16. The base width of the triangle is $d_1$. It is seen that narrowing of the slit shown by dotted lines R-S results in some reduced illumination efficiency (exposure level is reduced by the amounts outside the dotted lines) but, due to the triangular shape, is not as severe as a rectangular profile associated with copiers using conventional lenses. Further details of the exposure profile for SELFLOC type lens are found in an article by James D. Rees and William Lama entitled some "Radiometric Properties of Gradient-Index Fiber Lenses", Applied Optics. (April 1980, Vol. 19, No. 7, pp 1065–1069).

The various modes of operation possible with the imaging system shown in FIG. 1 are now considered. If the copy machine is to be operated in a conventional 1X mode, selection by an operator at control panel 46 will result in the document being moved through the scan zone in synchronism with the rotational speed of the photoreceptor.

If anamorphic reduction (or enlargement) in one dimension only is required, an operator selection at the control panel changes the rotational speed of stepper motor 44, 45 and drive rollers 35, 36 resulting in faster (for reduction) or slower (for enlargement) movement of documents through the exposure zone.

If anamorphic magnification in both dimensions is desired; (e.g. isomorphic magnification), a two step process is employed. A copy which has been anamorphically reduced by 50% from an original in a first scan is then reused as the "original" but rotated by 90° during the second scan. The same reduction value is selected from the output copy is symmetrical in both X and Y directions. If desired for special purpose copying applications, differing amounts of magnification can be selected for the X and Y directions e.g. 50% for the first pass: 25% for the second pass etc.

A notable feature of all of the operating media described above is that the system illumination requirements are set once to satisfy the requirements of all modes; e.g. illumination adjustment is not required during mode changes.

While the invention has been described with reference to the structure disclosed, it is not confined to the specific details set forth, but is intended to cover such modifications or changes as may come within the scope of the following claims:

What is claimed is:

1. An imaging system in a reproduction apparatus which transmits an image of an original document lying in an object plane onto a moving photosensitive image plane, said image being enlarged or reduced in at least one scanning dimension, said system comprising:

an illumination means adapted to provide an intense narrow beam of light to successive portions of the document to be copied, a linear gradient index lens array arranged in the optical path so as to project light reflected from said document during said scan onto the image plane, said lens array forming an image plane irradiance profile of first width $d_1$ means for scan/illuminating said document at a speed which is selectively changeable relative to the speed of said image plane, and a slit assembly aligned along the optical axis between the output face of said lens array and said image plane, said slit assembly having a slit aperture therethrough said slit aperture having a width $d_2$ less than said width $d_1$ whereby sucessive lens images are scanned and projected by the lens array through the slit aperture onto the image plane to form latent image of the document thereon.

2. The imaging system of claim 1 wherein said imaging system is adapted to operate in a first mode wherein the scan/illumination speed is the same as the speed of the image plane moving through the exposure zone and wherein the scanned image is projected at unity magnification onto the image plane, said imaging system further adapted to operate in a second, reduction, mode wherein the scan/illumination speed is greater than the image plane speed resulting in an anamorphically reduced image being formed at said image plane, said imaging system being still further adapted to operate in a third, enlargement, mode, wherein the scan/illumination speed is less than the image plane speed, resulting in an anamorphicaly reduced image being formed at said image plane.

3. The imaging system of claim 1 wherin said first width $d_1$ is 5 mm and said second width $d_2$ is approximately 1 mm.

4. The imaging system of claim 1 wherein said slit assembly is attached to the lens array with the slit aperture optically aligned with the center of the lens irradiance profile.

5. A method for forming anamorphically reduced or enlarged copies from an original document using the imaging system of claim 2 and including the steps of scanning the document at the reduction or enlargement scan to image plane speed ratio to obtain an output copy anamorphically magnified in a first direction, rotating the output copy 90° from the scanning orientation of the original document and scanning the copy at the same magnification value to obtain final output copy magnified in both directions.

6. The method of claim 5 where the scanning of the first copy is at a rate different than that used to scan the original.

7. In a copying system in which a document is moved past an optical scanning slit at a controlled speed in a copying pass to form an image of the document on a copier imaging surface by slit scan exposure of the document while the document is moved past the optical scanning slit at a present speed differing from the speed of said imaging surface to provide image reduction or magnification on the anamorphic copy made from said imaging surface in the direction of movement;

the improvement wherein a uniform, orthogonal, image reduction or magnification copy is provided by utilizing a normal non-anamorphic lens, and without changing lens, by using a dual copying pass, image reduction or magnification, on one axis at a time, in which an anamorphic copy is first made from the original document in a first copying pass, and then said anamorphic copy is used as an intermediate document for a second copying pass, but for said second copying pass, said anamorphic copy is initially rotated 90 degrees and then moved past said optical scanning slit oriented at 90 degrees in this second pass relative to said first pass, to provide anamorphic reduction of the image on that other axis, for proper, uniform, orthogonal, image reduction or magnification on the second pass copy.

* * * * *